United States Patent
Colombo et al.

(10) Patent No.: US 11,768,303 B2
(45) Date of Patent: Sep. 26, 2023

(54) AUTOMATIC DATA ENHANCEMENT FOR FULL WAVEFORM INVERSION IN THE MIDPOINT-OFFSET DOMAIN

(71) Applicant: Saudi Arabian Oil Company, Dhahran (SA)

(72) Inventors: Daniele Colombo, Dhahran (SA); Ernesto Sandoval Curiel, Dhahran (SA); Diego Rovetta, Delft (NL); Apostolos Kontakis, Delft (NL)

(73) Assignee: Saudi Arabian Oil Company, Dhahran (SA)

( * ) Notice: Subject to any disclaimer, the term of this patent is extended or adjusted under 35 U.S.C. 154(b) by 218 days.

(21) Appl. No.: 17/237,746

(22) Filed: Apr. 22, 2021

(65) Prior Publication Data

US 2022/0342101 A1 Oct. 27, 2022

(51) Int. Cl.
*G01V 1/30* (2006.01)
*G01V 1/36* (2006.01)

(52) U.S. Cl.
CPC .......... *G01V 1/303* (2013.01); *G01V 1/362* (2013.01); *G01V 1/368* (2013.01); *G01V 2210/322* (2013.01); *G01V 2210/52* (2013.01); *G01V 2210/6222* (2013.01)

(58) Field of Classification Search
None
See application file for complete search history.

(56) References Cited

U.S. PATENT DOCUMENTS

| | | | |
|---|---|---|---|
| 8,386,218 B2 | 2/2013 | Shin | |
| 10,067,255 B2 | 9/2018 | Colombo et al. | |
| 10,386,519 B2 | 8/2019 | Colombo et al. | |
| 10,852,450 B2 | 12/2020 | Colombo et al. | |
| 2016/0187513 A1 | 6/2016 | Poole et al. | |
| 2017/0068008 A1 | 3/2017 | Colombo et al. | |
| 2017/0176617 A1 | 6/2017 | Colombo et al. | |

(Continued)

FOREIGN PATENT DOCUMENTS

| | | |
|---|---|---|
| CA | 2928955 | 5/2015 |
| WO | WO 2016193180 | 12/2016 |
| WO | WO 2017106127 | 6/2017 |

OTHER PUBLICATIONS

Bakulin and Calvert, "The virtual source method: Theory and case study," Geophysics, 71, 2006, SI139-SI150, 12 pages.

(Continued)

*Primary Examiner* — Lina Cordero
(74) *Attorney, Agent, or Firm* — Fish & Richardson P.C.

(57) ABSTRACT

This specification describes workflows for, but is not limited to, performing full waveform inversion (FWI) to build high resolution velocity models to improve the accuracy of seismic imaging of a subterranean formation. This specification describes processes to automatically edit and enhance S/N quality of seismic data (such as land seismic data) to prepare the datasets for FWI. The methods for automatic corrections and pre-processing include: automatic iterative surface-consistent residual statics calculation, automatic rejection of anomalous traces (such as dead traces), and the automatic correction of surface-consistent amplitude anomalies (such as by scalar or deconvolution approaches). The operations include automatic "muting" of noise before first arrivals.

20 Claims, 11 Drawing Sheets

(56) References Cited

U.S. PATENT DOCUMENTS

2018/0321405 A1 11/2018 Colombo et al.
2018/0335530 A1* 11/2018 Wu .................... G01V 1/282
2018/0372897 A1 12/2018 Colombo et al.
2021/0190983 A1 6/2021 Colombo et al.

OTHER PUBLICATIONS

Columbo et al., "Fully automated near-surface analysis by surface-consistent refraction method," Geophysics Technology, EXPEC Advanced Research Center, 81(4): U39-U49, Jul. 2016, 11 pages.
Frisk and Lynch, "Shallow water waveguide characterization using the Hankel transform," The Journal of the Acoustical Society of America, 76(1), 1984, 205-216, 12 pages.
Lian X et al., "An Innovative Spark Based Surface Consistent Residual Static Correction Method," 81st EAGE Conference & Exhibition, Jun. 3-6, 2019, 6 pages.
Pratt, "Seismic waveform inversion in the frequency domain, Part 1: Theory and verification in a physical scale model," Geophysics, 64(3), 1999, 888-901, 4 pages.
Sedova et al., "Acoustic Land Full Waveform Inversion on a Broadband Land Dataset: the Impact of Optimal Transport." 81st EAGE Conference and Exhibition 2019. vol. 2019. No. 1. European Association of Geoscientists & Engineers, Jun. 2019, 5 pages.
Shin and Ho Cha, "Waveform inversion in the Laplace—Fourier domain," Geophysical Journal International, 177(3), 2009, 1067-1079, 11 pages.
Tarantola, "Inversion of seismic reflection data in the acoustic approximation," Geophysics, 49(8), 1984, 1259-1266, 8 pages.

\* cited by examiner

AUTOMATIC DATA ENHANCEMENT FOR FULL WAVEFORM INVERSION IN THE MIDPOINT-OFFSET DOMAIN

TECHNICAL FIELD

This specification relates generally to geophysical exploration, and more particularly to seismic surveying and processing of seismic data.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications including identification of potential petroleum reservoirs. Seismic surveys are conducted by using a controlled seismic source (for example, a seismic vibrator or dynamite) to create seismic waves. The seismic source is typically located at ground surface. Seismic body waves travel into the ground, are reflected by subsurface formations, and return to the surface where they are recorded by sensors called geophones. Seismic surface waves travel along the ground surface and diminish as they get further from the surface. Seismic surface waves travel more slowly than seismic body waves. The geologists and geophysicists analyze the time it takes for the seismic body waves to reflect off subsurface formations and return to the surface to map sedimentary facies and other geologic features. Similarly, analysis of the time it takes seismic surface waves to travel from source to sensor can provide information about near surface features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

The seismic industry has experienced an increase in the number of seismic acquisition channels. The increased number of seismic acquisition channels has led to greater availability of data acquired in seismic surveys. However, conventional seismic data processing and analysis methods can be less useful for handling the increased amounts of data provided by modern seismic acquisition systems. For example, near surface analysis related to the increased size of the seismic datasets can pose challenges. Traditional methods for analysis of the subsurface domain, based on interactive procedures where input of an analyst is required can require time-consuming human intervention for quality control of the data.

SUMMARY

This specification describes workflows for, but is not limited to, performing full waveform inversion (FWI) to build high resolution velocity models to improve the accuracy of seismic imaging of a subterranean formation. One of several aspects involved in FWI is pre-processing or pre-conditioning of seismic data. The preprocessing of the seismic data can require significant effort and that are time-consuming, especially for land seismic data which generally include lower signal-to-noise ratio value (S/N) quality. This specification describes processes to automatically edit and enhance S/N quality of seismic data (such as land seismic data) to prepare the datasets for FWI. Specifically, the seismic data are preprocessed. Preprocessing is performed for any spatial dimensionality of the seismic data, including one dimensional (1D), two dimensional (2D), three dimensional (3D), and/or four dimensional (4D) data. When enhanced virtual shot gathers (eVSG) are generated (as subsequently described), the processing is reduced to 1D/1.5D for 1.5 dimensional (1.5D) FWI. The processes described in this specification include a specific sorting domain, a specific surface-consistent analysis, surface-consistent corrections of amplitudes, and generation of virtual super shot gathers (VSP). Virtual super gathers are generated by stacking of pilot traces in the midpoint-offset domain. The virtual super gathers are then used to demonstrate 1 dimensional (1D) Laplace-Fourier FWI using synthetic data. The methods described in this specification are capable of handling lower S/N quality generally present in real seismic data by preprocessing that seismic data for FWI. The methods described in this specification reduce the effects of low S/N on calculation of residuals which are inverted.

The specification describes pre-processing the virtual super gathers to enhance S/N and optimally prepare the data for the successive step of FWI. The methods for automatic corrections and pre-processing include: automatic iterative surface-consistent residual statics calculation, automatic rejection of anomalous traces (such as dead traces), and the automatic correction of surface-consistent amplitude anomalies (such as by scalar or deconvolution approaches). In some implementations, the processes include automatic "muting" of noise before first arrivals. In some implementations, the processes include automatic "muting" of surface waves for acoustic FWI. The described process is applicable in the time domain, frequency-domain, and Laplace-Fourier FWI domain.

Embodiments of these systems and methods can include one or more of the following features.

In a general aspect, a method is for generating a velocity model to improve an accuracy of seismic imaging of a subterranean formation. The method includes receiving, by a computer system, for each of a plurality of common midpoint-offset bins each associated with data representing a plurality of seismic traces, a candidate pilot trace representing that common midpoint-offset bin. The method includes, for each common midpoint-offset bin: generating, by the computer system, a corrected pilot trace based on an iterative rejection of anomalous traces of the plurality of seismic traces; performing, by the computer system, an iterative correction of surface-consistent amplitude anomalies for each trace in the plurality of seismic traces; and generating corrected traces based on the corrected pilot trace and based on the iterative correction of surface-consistent amplitude anomalies. The method includes grouping, by the computer system, the corrected traces for the plurality of common midpoint-offset bins into a plurality of enhanced virtual shot gathers (eVSGs).

In some implementations, the method includes performing, by the computer system, a 1.5 dimensional full waveform inversion based on the plurality of enhanced virtual shot gathers. In some implementations, the method includes determining, by the computer system, a subsurface velocity model based on the 1.5 dimensional full waveform inversion.

In some implementations, the method includes performing, on the grouping of the corrected traces for each enhanced virtual shot gather, an automatic outer mute of noise occurring before first arrival data. In some implementations, the method includes performing, on the grouping of the corrected traces for each enhanced virtual shot gather, an automatic inner mute of noise including surface waves of the eVSG.

In some implementations, the method includes generating the candidate pilot trace by performing operations including: sorting, by a computer system, the plurality of seismic traces into the plurality of common midpoint-offset bins. In some implementations, the method includes, for each common midpoint-offset bin of the plurality of common midpoint-offset bins: applying, by the computer system, a linear moveout correction to a collection of seismic traces within the common midpoint-offset bin; stacking, by the computer system, the collection of seismic traces to form a pilot trace; determining, by the computer system, a surface-consistent residual static correction for each seismic trace of the collection of seismic traces; determining, by the computer system, that the surface-consistent residual static correction for each seismic trace is less than a threshold; and responsive to the determining that the surface-consistent residual static correction is less than the threshold, stacking, by the computer system, the collection of seismic traces to provide the candidate pilot trace for that common midpoint-offset bin.

In some implementations, the iterative rejection of anomalous traces of the plurality of seismic traces includes receiving, for the common midpoint-offset bin, data representing the plurality of seismic traces, a threshold amplitude scale value and a threshold amplitude similarity. The iterative rejection of anomalous traces of the plurality of seismic traces includes, for each trace of the plurality of seismic traces: estimating an amplitude of the trace; and determining a deviation value of the amplitude from an average amplitude scale for the plurality of traces. The iterative rejection of anomalous traces of the plurality of seismic traces includes removing traces, from the plurality of seismic traces, associated with deviation values exceeding the threshold amplitude scale value; generating a candidate pilot trace by stacking remaining traces of the plurality of seismic traces; determining a similarity value representing a similarity between the candidate pilot trace and each of the remaining traces; comparing, for each remaining trace, the similarity value to the threshold similarity value; generating final traces by removing remaining traces for which the similarity value does not satisfy the threshold similarity value; and outputting, based on the final traces, the corrected pilot trace representing the common midpoint-offset bin.

In some implementations, performing, by the computer system, the iterative correction of surface-consistent amplitude anomalies for each trace in the plurality of seismic traces comprises: receiving the candidate pilot trace and the plurality of seismic traces for the common midpoint-offset bin. In some implementations, performing, by the computer system, the iterative correction of surface-consistent amplitude anomalies for each trace in the plurality of seismic traces comprises, for each trace of the plurality of seismic traces: determining a ratio of a first energy measure of the trace and a second energy measure of the candidate pilot trace; generating source and receiver scaling factors based on a surface-consistent inversion of the ratio for each trace; and applying the source and receiver scaling factors to the trace to generate a balanced trace.

In some implementations, performing, by the computer system, the iterative correction of surface-consistent amplitude anomalies for each trace in the plurality of seismic traces comprises: receiving the candidate pilot trace and the plurality of seismic traces for the common midpoint-offset bin. In some implementations, performing, by the computer system, the iterative correction of surface-consistent amplitude anomalies for each trace in the plurality of seismic traces comprises, for each trace of the plurality of seismic traces: determining a ratio of a first spectrum magnitude of the trace and a second spectrum magnitude of the candidate pilot trace; generating source and receiver amplitude frequency operators based on a surface-consistent inversion of the ratio for each trace; and applying the source and receiver amplitude frequency operators to the trace to generate an amplitude deconvolved trace.

In a general aspect, a system for generating a velocity model to improve an accuracy of seismic imaging of a subterranean formation includes at least one processor and a memory storing instructions that, when executed by the at least one processor, cause the at least one processor to perform operations. The operations include receiving, for each of a plurality of common midpoint-offset bins each associated with data representing a plurality of seismic traces, a candidate pilot trace representing that common midpoint-offset bin. The operations include, for each common midpoint-offset bin: generating a corrected pilot trace based on an iterative rejection of anomalous traces of the plurality of seismic traces; performing an iterative correction of surface-consistent amplitude anomalies for each trace in the plurality of seismic traces; and generating corrected traces based on the corrected pilot trace and based on the iterative correction of surface-consistent amplitude anomalies. The operations include grouping the corrected traces for the plurality of common midpoint-offset bins into a plurality of enhanced virtual shot gathers (eVSGs).

In some implementations, the operations include performing a 1.5 dimensional full waveform inversion based on the plurality of enhanced virtual shot gathers. In some implementations, the operations include determining a subsurface velocity model based on the 1.5 dimensional full waveform inversion.

In some implementations, the operations include performing, on the grouping of the corrected traces for each enhanced virtual shot gather, an automatic outer mute of noise occurring before first arrival data. In some implementations, the operations include performing, on the grouping of the corrected traces for each enhanced virtual shot gather, an automatic inner mute of noise including surface waves of the eVSG.

In some implementations, the operations include generating the candidate pilot trace by performing operations including: sorting the plurality of seismic traces into the plurality of common midpoint-offset bins. In some implementations, the operations include, for each common midpoint-offset bin of the plurality of common midpoint-offset bins: applying a linear moveout correction to a collection of seismic traces within the common midpoint-offset bin; stacking the collection of seismic traces to form a pilot trace; determining a surface-consistent residual static correction for each seismic trace of the collection of seismic traces; determining that the surface-consistent residual static correction for each seismic trace is less than a threshold; and responsive to the determining that the surface-consistent residual static correction is less than the threshold, stacking the collection of seismic traces to provide the candidate pilot trace for that common midpoint-offset bin.

In some implementations, the iterative rejection of anomalous traces of the plurality of seismic traces includes receiving, for the common midpoint-offset bin, data representing the plurality of seismic traces, a threshold amplitude scale value and a threshold amplitude similarity. The iterative rejection of anomalous traces of the plurality of seismic traces includes, for each trace of the plurality of seismic traces: estimating an amplitude of the trace; and determining a deviation value of the amplitude from an average amplitude scale for the plurality of traces. The iterative rejection of anomalous traces of the plurality of seismic traces includes removing traces, from the plurality of seismic traces, associated with deviation values exceeding the threshold amplitude scale value; generating a candidate pilot trace by stacking remaining traces of the plurality of seismic traces; determining a similarity value representing a similarity between the candidate pilot trace and each of the remaining traces; comparing, for each remaining trace, the similarity value to the threshold similarity value; generating final traces by removing remaining traces for which the similarity value does not satisfy the threshold similarity value; and outputting, based on the final traces, the corrected pilot trace representing the common midpoint-offset bin.

In some implementations, performing the iterative correction of surface-consistent amplitude anomalies for each trace in the plurality of seismic traces comprises: receiving the candidate pilot trace and the plurality of seismic traces for the common midpoint-offset bin. In some implementations, performing the iterative correction of surface-consistent amplitude anomalies for each trace in the plurality of seismic traces comprises, for each trace of the plurality of seismic traces: determining a ratio of a first energy measure of the trace and a second energy measure of the candidate pilot trace; generating source and receiver scaling factors based on a surface-consistent inversion of the ratio for each trace; and applying the source and receiver scaling factors to the trace to generate a balanced trace.

In some implementations, performing the iterative correction of surface-consistent amplitude anomalies for each trace in the plurality of seismic traces comprises: receiving the candidate pilot trace and the plurality of seismic traces for the common midpoint-offset bin. In some implementations, performing the iterative correction of surface-consistent amplitude anomalies for each trace in the plurality of seismic traces comprises, for each trace of the plurality of seismic traces: determining a ratio of a first spectrum magnitude of the trace and a second spectrum magnitude of the candidate pilot trace; generating source and receiver amplitude frequency operators based on a surface-consistent inversion of the ratio for each trace; and applying the source and receiver amplitude frequency operators to the trace to generate an amplitude deconvolved trace.

In a general aspect, one or more non-transitory computer readable media storing instructions for generating a velocity model to improve an accuracy of seismic imaging of a subterranean formation, the instructions, when executed by at least one processor, configured to cause the at least one processor to perform operations. The operations include receiving, for each of a plurality of common midpoint-offset bins each associated with data representing a plurality of seismic traces, a candidate pilot trace representing that common midpoint-offset bin. The operations include, for each common midpoint-offset bin: generating a corrected pilot trace based on an iterative rejection of anomalous traces of the plurality of seismic traces; performing an iterative correction of surface-consistent amplitude anomalies for each trace in the plurality of seismic traces; and generating corrected traces based on the corrected pilot trace and based on the iterative correction of surface-consistent amplitude anomalies. The operations include grouping the corrected traces for the plurality of common midpoint-offset bins into a plurality of enhanced virtual shot gathers (eVSGs).

In some implementations, the operations include performing a 1.5 dimensional full waveform inversion based on the plurality of enhanced virtual shot gathers. In some implementations, the operations include determining a subsurface velocity model based on the 1.5 dimensional full waveform inversion.

In some implementations, the operations include performing, on the grouping of the corrected traces for each enhanced virtual shot gather, an automatic outer mute of noise occurring before first arrival data. In some implementations, the operations include performing, on the grouping of the corrected traces for each enhanced virtual shot gather, an automatic inner mute of noise including surface waves of the eVSG.

In some implementations, the operations include generating the candidate pilot trace by performing operations including: sorting the plurality of seismic traces into the plurality of common midpoint-offset bins. In some implementations, the operations include, for each common midpoint-offset bin of the plurality of common midpoint-offset bins: applying a linear moveout correction to a collection of seismic traces within the common midpoint-offset bin; stacking the collection of seismic traces to form a pilot trace; determining a surface-consistent residual static correction for each seismic trace of the collection of seismic traces; determining that the surface-consistent residual static correction for each seismic trace is less than a threshold; and responsive to the determining that the surface-consistent residual static correction is less than the threshold, stacking the collection of seismic traces to provide the candidate pilot trace for that common midpoint-offset bin.

In some implementations, the iterative rejection of anomalous traces of the plurality of seismic traces includes receiving, for the common midpoint-offset bin, data representing the plurality of seismic traces, a threshold amplitude scale value and a threshold amplitude similarity. The iterative rejection of anomalous traces of the plurality of seismic traces includes, for each trace of the plurality of seismic traces: estimating an amplitude of the trace; and determining a deviation value of the amplitude from an average amplitude scale for the plurality of traces. The iterative rejection of anomalous traces of the plurality of seismic traces includes removing traces, from the plurality of seismic traces, associated with deviation values exceeding the threshold amplitude scale value; generating a candidate pilot trace by stacking remaining traces of the plurality of seismic traces; determining a similarity value representing a similarity between the candidate pilot trace and each of the remaining traces; comparing, for each remaining trace, the similarity value to the threshold similarity value; generating final traces by removing remaining traces for which the similarity value does not satisfy the threshold similarity value; and outputting, based on the final traces, the corrected pilot trace representing the common midpoint-offset bin.

In some implementations, performing the iterative correction of surface-consistent amplitude anomalies for each trace in the plurality of seismic traces comprises: receiving the candidate pilot trace and the plurality of seismic traces for the common midpoint-offset bin. In some implementations, performing the iterative correction of surface-consistent amplitude anomalies for each trace in the plurality of seismic traces comprises, for each trace of the plurality of seismic traces: determining a ratio of a first energy measure of the trace and a second energy measure of the candidate pilot trace; generating source and receiver scaling factors based on a surface-consistent inversion of the ratio for each trace; and applying the source and receiver scaling factors to the trace to generate a balanced trace.

In some implementations, performing the iterative correction of surface-consistent amplitude anomalies for each trace in the plurality of seismic traces comprises: receiving the candidate pilot trace and the plurality of seismic traces for the common midpoint-offset bin. In some implementations, performing the iterative correction of surface-consistent amplitude anomalies for each trace in the plurality of seismic traces comprises, for each trace of the plurality of seismic traces: determining a ratio of a first spectrum magnitude of the trace and a second spectrum magnitude of the candidate pilot trace; generating source and receiver amplitude frequency operators based on a surface-consistent inversion of the ratio for each trace; and applying the source and receiver amplitude frequency operators to the trace to generate an amplitude deconvolved trace.

The details of one or more embodiments are set forth in the accompanying drawings and the description below. Other features and advantages will be apparent from the description and drawings, and from the claims.

DETAILED DESCRIPTION

Figure 1A:
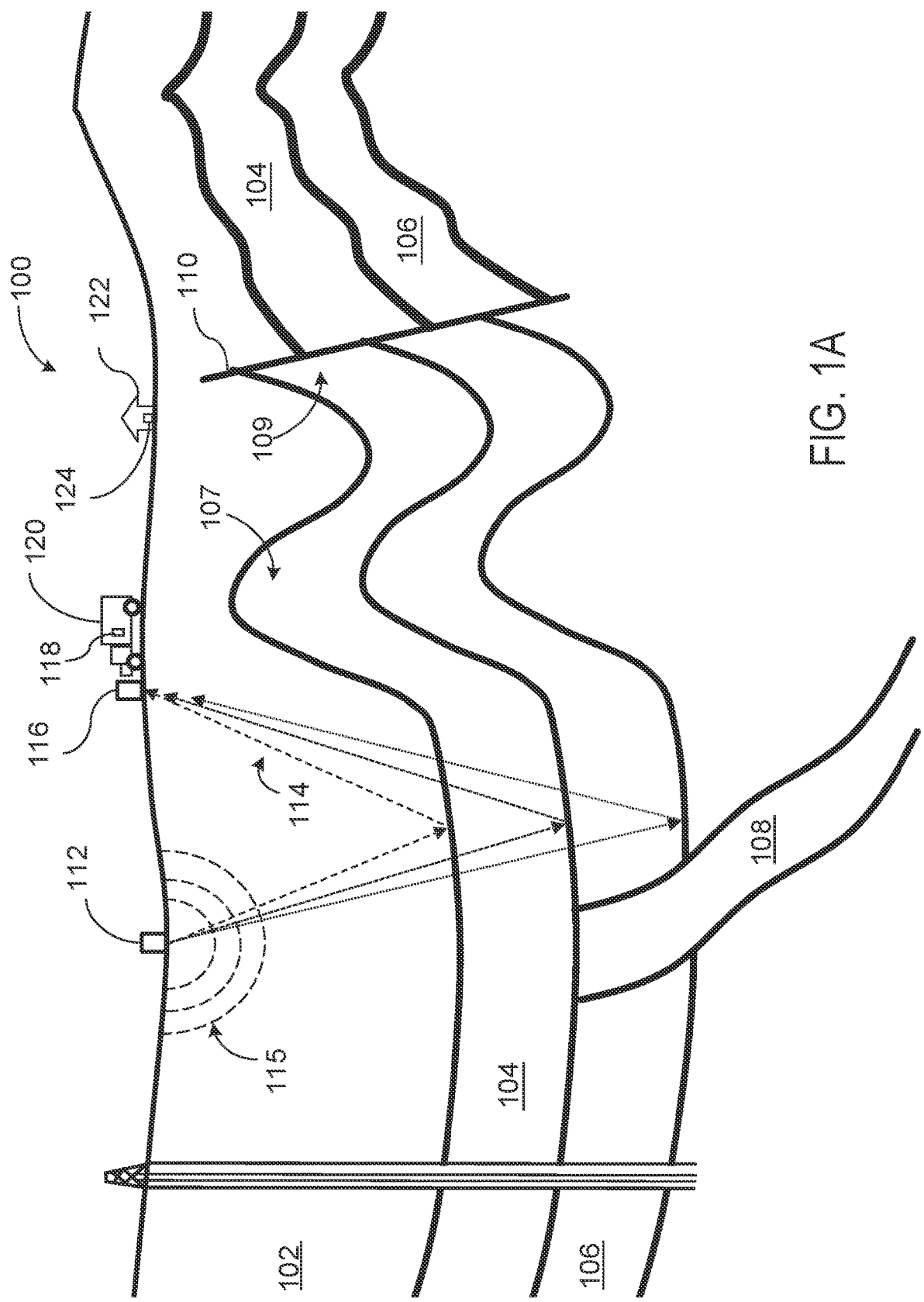
FIG. 1A is a schematic view of a seismic survey being performed to map subterranean features such as facies and faults.

This specification describes workflows for, but is not limited to, performing 1.5 dimensional (1.5D) full waveform inversion (FWI) to build high resolution velocity models to improve the accuracy of seismic imaging of a subterranean formation. It is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

This specification describes processes and software algorithms designed to obtain enhanced Virtual Super Gathers (eVSG). The eVSGs are then used by a computing system to perform full waveform inversion (FWI) and other possible steps of data processing including normal moveout correction (NMO), velocity picking, common midpoint gather (CMP) stacking, and time or depth imaging. This process includes aspects of processes described in application Ser. No. 16/748,038, filed on Jan. 21, 2020, U.S. Pat. No. 10,067,255, filed on Sep. 4, 2015, U.S. Pat. No. 10,386,519, filed on Nov. 28, 2016, and U.S. Pat. No. 10,852,450, filed on May 3, 2017, the contents of each of which are hereby incorporated by reference in entirety.

This specification describes a process for performing 1.5D FWI in accordance with the following steps, subsequently described in further detail. A data processing system is configured to sort travel times and seismic traces data in common midpoint-offset bins (called the XYO domain). The data processing system is configured to estimate and apply a linear moveout to the sorted traces data. The data processing system is configured to stack the collection of seismic traces data to form a pilot trace. The data processing system is configured to determine a surface-consistent (residual) static correction for each seismic trace. The data processing system is configured to iterate the residual static correction calculation, comparing values for each seismic trace to a threshold value. The data processing system is configured to generate a new pilot trace stack after iterative residual statics corrections are performed for each midpoint-offset bin. The data processing system is configured to perform group a collection of multiple pilots into a Virtual Super Gather (VSG). The data processing system is configured to perform 1.5 D Full Waveform Inversion (FWI) using the VSG.

This process solves a technical problem encountered when using real seismic data (rather than simulated seismic data). Generally, real seismic data includes S/N values that are too low for performing FWI. To overcome this, the additional processing steps subsequently described are included to enable FWI on real seismic data. As previously described, preprocessing is performed for any spatial dimensionality of the seismic data, including 1D, 2D, 3D, and/or 4D data. When eVSG are generated (as subsequently described), the processing is reduced to 1D/1.5D for 1.5 dimensional (1.5D) FWI. These processing steps are in addition to the previously described processing steps. These processing steps are related to near-surface amplitude corrections and related to the coupling of vibrator plates (seismic sources) or geophones (receivers) to the ground, to the shallow near surface geology, or both. The near-surface amplitude corrections are not able to be directly embedded into an inverse calculation such as FWI solving for velocities. To solve this problem, the process includes an application of iterative residual statics corrections and pre-correction the traces for amplitude anomalies before the generation of the pilot trace and of the VSG. The residual statics corrections are related to the kinematics of the waves and operating on the seismic phase arrival time. The kinematic portion of the correction (such as phase residual, residual statics, and so forth) is related to velocity. The amplitude corrections (often called dynamic) are related to multiple aspects as subsequently discussed. The traces are first corrected for residual statics in a first step, and subsequently corrected for residual amplitudes in a second step. The residual statics provide the alignment of the seismic phases and the generation of a pilot trace. An amplitude residual is then evaluated and corrected. This process is iterative, similar to the residual statics step previously described. U.S. Pub. No. 2018/0321405, incorporated by reference in entirety, describes surface-consistent amplitude anomaly compensation and deconvolution that can be included in this process.

FIG. 1A is a schematic view of a seismic survey being performed to map subterranean features such as facies and faults in a subterranean formation 100 under a marine feature (such as under the sea or ocean). The subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1A shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1A, the source or sources 112 are typically a line or an array of sources 112. The generated seismic waves include seismic body waves 114 that travel into the ground and seismic surface waves 115 travel along the ground surface and diminish as they get further from the marine surface.

The velocity of these seismic waves depends on properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by a sensor or sensors 116. Although illustrated as a single component in FIG. 1A, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

The seismic surface waves 115 travel more slowly than seismic body waves 114. Analysis of the time it takes seismic surface waves 115 to travel from source to sensor can provide information about near surface features.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing the subterranean formation 100. The seismic cube can also display results of the analysis of the seismic data associated with the seismic survey.

Figure 1B:
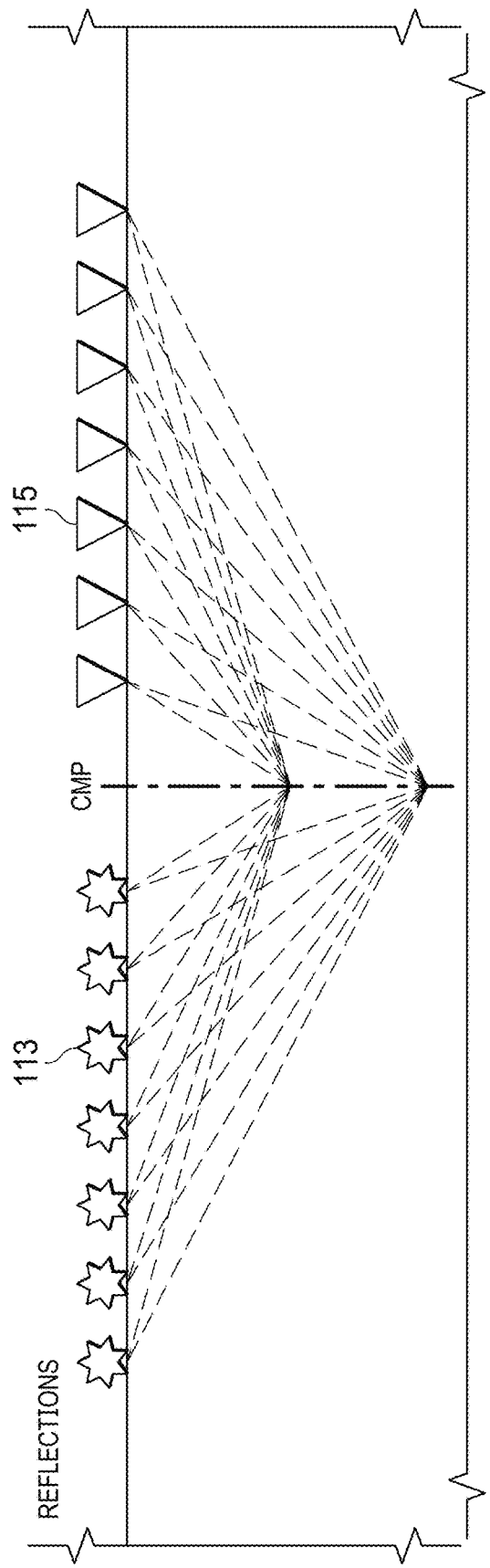
FIG. 1B illustrates incident and reflected rays at a common midpoint (CMP) position compared to refracted ray paths.
Figure 1B:
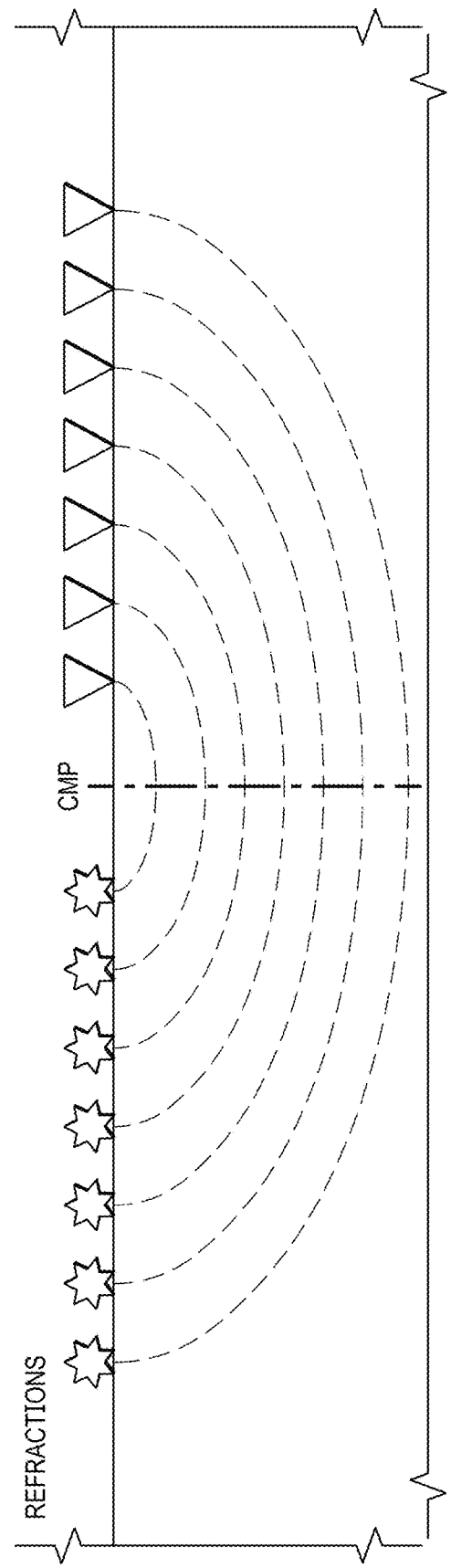

FIG. 1B illustrates incident and reflected rays at a common midpoint (CMP) position compared to refracted ray paths. In the idealized, one-dimensional (1D) model depicted in FIG. 1B (velocity increasing with depth), the offset (O) between a shot source (for example, source 113) and a receiver (for example, receiver 115) controls the depth of penetration of the refracted waves. For refracted waves, an effective and concise representation of the subsurface structure is obtained by sorting or binning traces in a CMP-offset domain (referred to as XYO binning). After binning the received seismic traces (or the first break picks), statistics are calculated for each bin (for example, mean, median, mode, standard deviation, and cross-correlation). Multidimensional binning is applied to a 3D dataset of seismic traces as shown in FIGS. 2-3.

Figure 2:
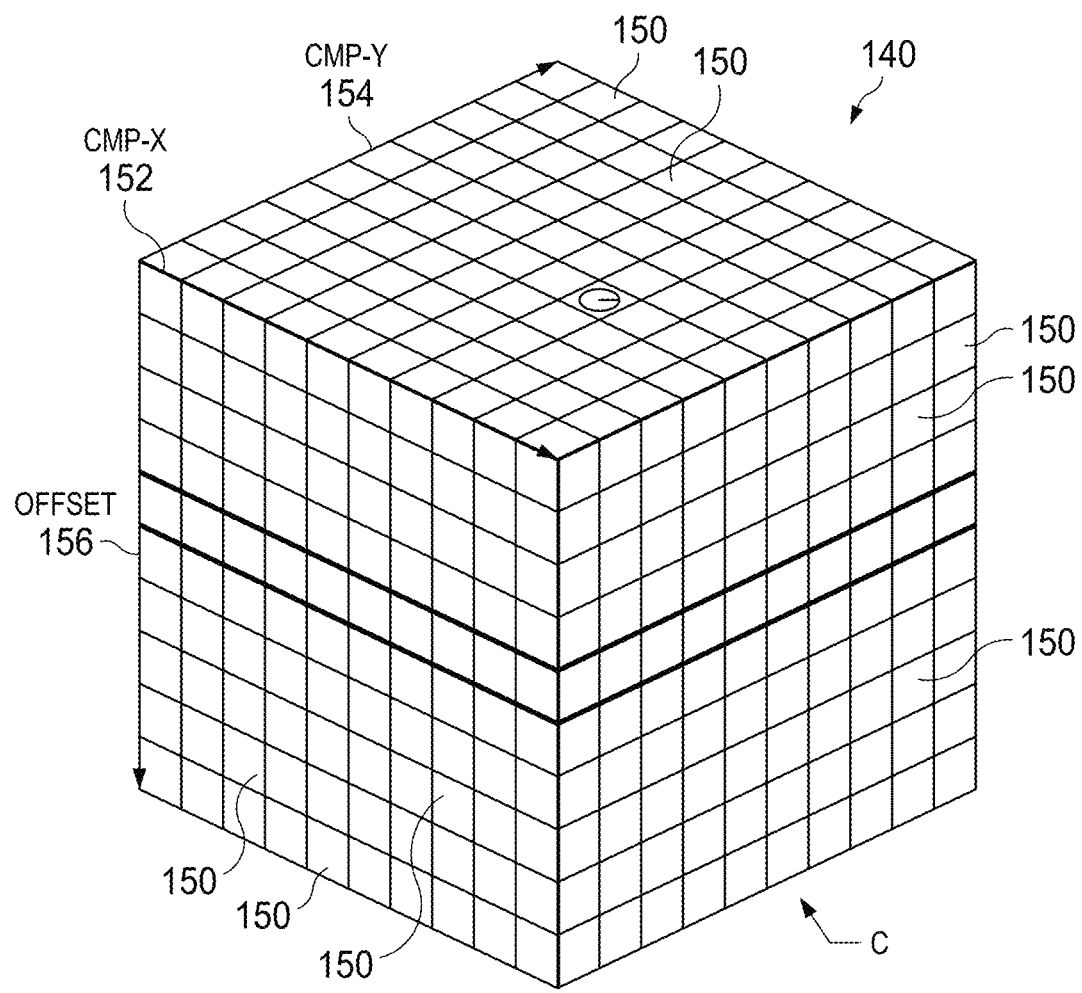
FIG. 2 illustrates a three-dimensional cube representing a subterranean formation.

FIG. 2 illustrates seismic trace sorting into CMP-offset bins 150. The multidimensional attribute cubes or bins are used for quality control since these cubes or bins 150 enable a visualization of the spatial trends of the travel time (mean values) and the noisy areas (standard deviation). When performing the 3D CMP-offset binning (that is, XYO binning in the directions of CMP-X 152, CMP-Y 154, and offset 156), the bin sizes in the CMP-X 152 and CMP-Y 154 directions can be kept greater, such that a sufficient number of CMPs are placed in a bin 150 to provide functionally applicable statistics. The XYO binning illustrated in FIG. 2 is different from sorting in a common offset domain as the latter collects data sharing a common offset but pertaining to different CMPs. The existing CMP sorting (time-offset) that is applied for reflected waves is less useful for refracted waves as it would display events with variable velocities over the offset axis. The XYO binning method is therefore an effective representation of both CMP and offset domains where common properties at a CMP position can be assessed.

In some implementations, as shown in FIG. 2, the XYO space 140 is divided into XYO cubes or bins 150 of a particular size. For example, each bin 150 can have a size of 100 meters (m) in the CMP-X direction, 100 m in the CMP-Y direction, and 50 m in the offset direction. For each trace (or first break pick), the offset (the distance between the source and the receiver) and the CMP (the middle point position between the source and the receiver) are determined, and the trace is sorted into a particular bin based on the offset and the CMP. Each XYO bin 150 includes a collection of traces sharing a common (or similar) midpoint position and a common (or similar) offset. The collection of traces in an XYO bin is sometimes referred to as an XYO gather.

Figure 3:
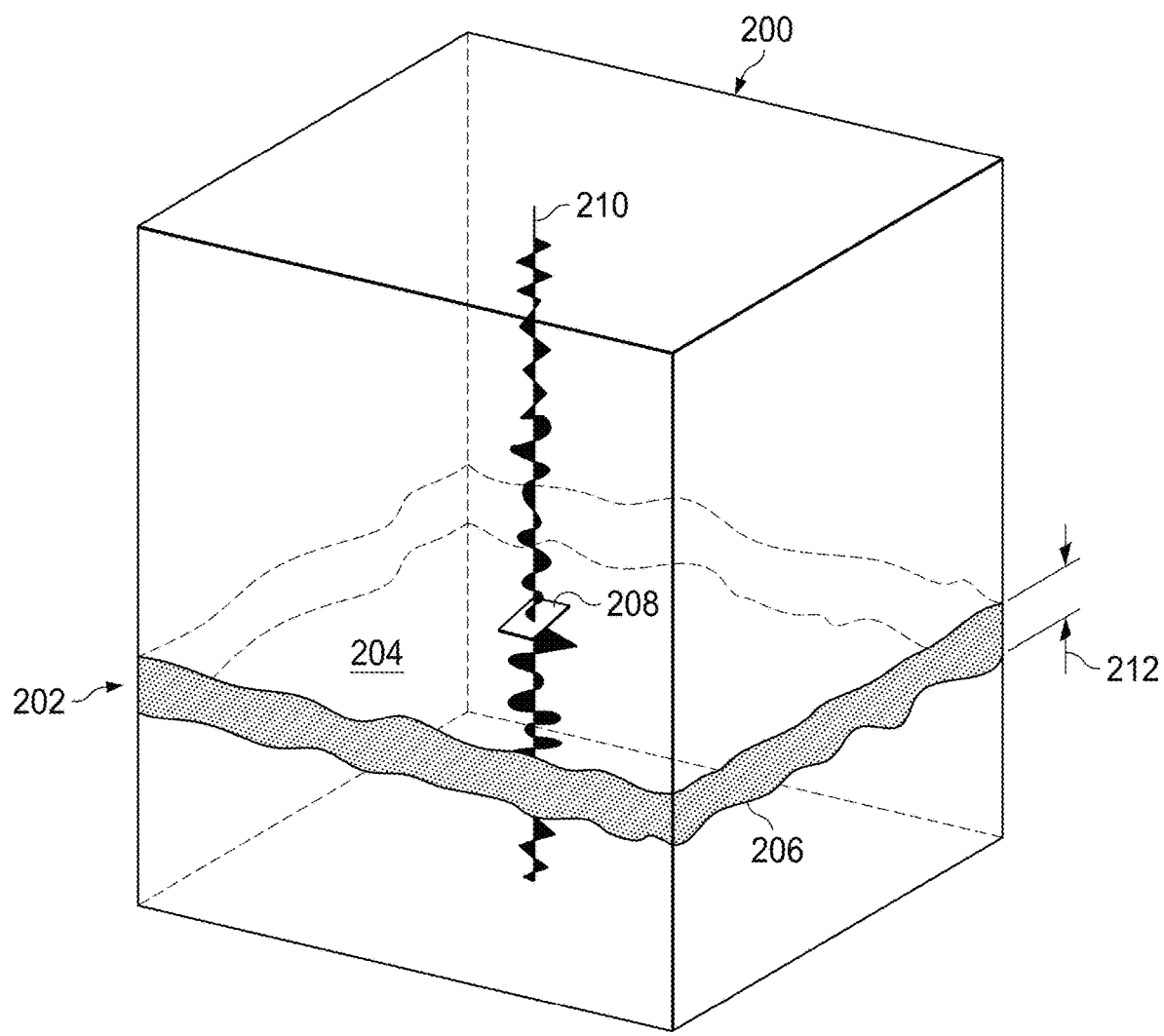
FIG. 3 illustrates a stratigraphic trace within the three-dimensional cube of FIG. 2.

FIG. 3 illustrates a seismic cube 200 representing a formation. The seismic cube has a stratum 202 based on a surface (for example, an amplitude surface 204) and a stratigraphic horizon 206. The amplitude surface 204 and the stratigraphic horizon 206 are grids that include many cells such as exemplary cell 208. Each cell is a sample of a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4:
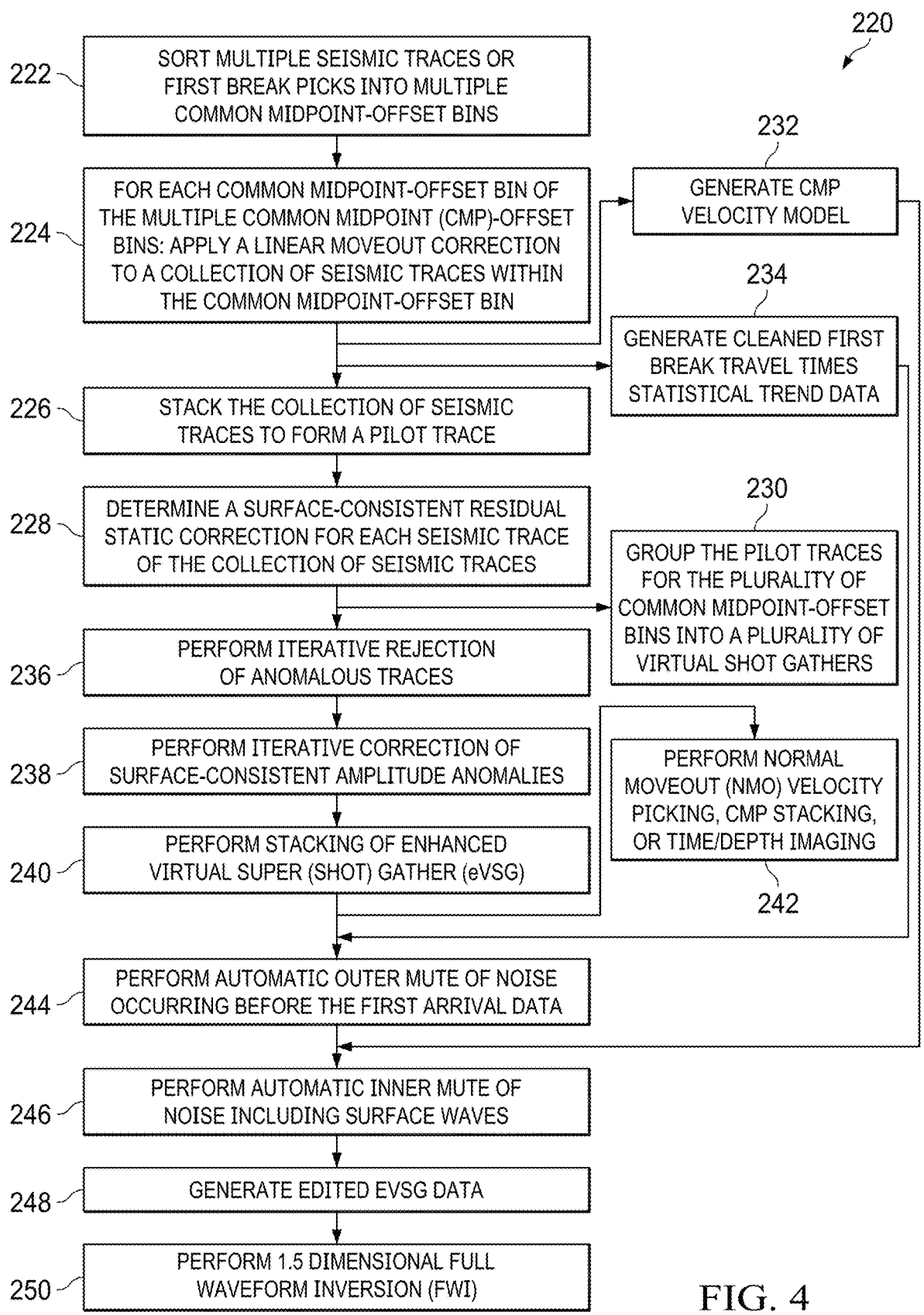
FIG. 4 shows a process for generation of enhanced virtual super gathers (eVSG) for FWI.

FIG. 4 illustrates a process 220 for generating a virtual shot gather for FWI in the midpoint-offset domain. In some implementations, the process 220 is performed by a computer system. Such a computer system is described in more detail at the end of this specification.

In step 222, the computer system sorts multiple seismic traces into multiple common midpoint-offset bins (XYO bins). The seismic data is sorted in the midpoint-offset domain (XYO) where traces are grouped together to form a seismic gather. The seismic traces sorted into each XYO bin have same X, Y, and offset (O) coordinates.

In step 224, for each XYO bin the computer system applies a linear moveout (LMO) correction to a collection of seismic traces within the XYO bin. The collection of seismic traces is obtained from recorded seismic energy travel from multiple seismic sources to multiple seismic receivers during a seismic survey. The dimensional offsets of the multiple seismic receivers can include a common midpoint X axis of the seismic survey, a common midpoint Y axis of the seismic survey, an offset axis, and an azimuth axis. A size of the LMO correction increases as a size of each common midpoint-offset bin increases. For example, the LMO correction is applied to the collection of seismic traces using an apparent velocity derived from a smooth spline fit evaluated at the central offset in the XYO bin. If the lateral velocity variations are small, the gather is generally flat near the first arrival. This property is exploited in order to recover residual statics.

The LMO correction is applied to enable the stacking of the transmitted (or refracted) waveforms. This correction is related to the size of the offset bin (XYO bin)—the greater the size of the offset bin, the greater the effect of the LMO correction. For the end-term case where a size of the offset bin is less enough to contain only one seismic trace, the LMO correction will be null. The LMO correction in the generation of the pilot trace emphasizes the contribution of the transmitted waveforms. For an offset bin having a greater size, the LMO correction will allow the transmitted energy to stack coherently while the reflected energy and the surface waves, that have a different moveout value, will be attenuated.

In step 226, the computer system stacks the collection of seismic traces within each XYO bin to form a pilot trace. The pilot seismic trace is generated from each XYO gather to calculate surface-consistent residual time shifts that are applied to sources and receivers. Step 226 is performed for each XYO bin.

In step 228, the computer system determines a surface-consistent residual static correction for each seismic trace of the collection of seismic traces within each XYO bin. Step 228 is performed for each XYO bin and for each trace of the collection of seismic traces within each XYO bin. To determine the surface-consistent residual static correction, the computer system determines a time shift based on cross-correlation of each seismic trace with the pilot trace. Time shifts are calculated for each seismic trace through cross-correlation to the pilot trace. The computer system provides the surface-consistent residual static correction based on inversion of the time shift for a seismic source position and a seismic receiver position. The time residual for each seismic trace is inverted for the source and receiver positions (surface-consistent).

In step 230, the computer system determines whether the surface-consistent residual static correction for each seismic trace is less than a threshold. In some implementations, the iterative procedure stops when there is no further correction estimated, such as when the further correction is less than or equal to the threshold (for example, a one-time sample). In other implementations, the iterative procedure stops when successive iterations display an oscillatory character, for example, when the alignment or the traces worsen. The latter can happen when noise is being inverted. In other implementations, the threshold is selected by a user. Step 230 is performed for each XYO bin and for each trace of the collection of seismic traces within each XYO bin. Responsive to determining that the surface-consistent residual static correction is greater than the threshold, the computer system applies the surface-consistent residual static correction to each seismic trace in an iterative manner. A new pilot trace is evaluated for each XYO bin (XYO gather) and the process is iterated until the inverted surface-consistent residual statics updates are zero or less than the pre-defined threshold. The most accurate pilot trace representation expressing the average normalized stack of the seismic traces in the XYO gather can be obtained using equation (1) as follows.

$$\tilde{W}'(t) = \frac{1}{N_b} \sum_{b=1}^{N_b} \tilde{P}'_b(t) \qquad (1)$$

In equation (1), $\tilde{W}'(t)$ denotes the XYO gather average response (pilot trace), $\tilde{P}'_b(t)$ denotes the trace in an XYO gather, and the index b denotes each of the $N_b$ traces of a specific XYO gather. The index b is directly related to the source and receiver indices couple: $(i,j) \rightarrow b$. For inverting for surface-consistency at each iteration, the time shift corrections for each seismic trace are regularized across the entire seismic survey to ensure robustness and redundancy. The iterations are performed to generate updated surface-consistent time shifts and updated pilot traces until the time correction is null or cannot further decrease, and the pilot trace provided represents all the other seismic traces in the XYO gather.

In step 230, responsive to determining that the surface-consistent residual static correction is less than the threshold, the computer system stacks the collection of seismic traces within each XYO bin to provide the pilot trace for that XYO bin. Step 230 is performed for each XYO bin and for each trace of the collection of seismic traces within each XYO bin. The repetition of the process illustrated in FIG. 3 for each XYO bin results in the generation of a virtual shot gather for the XY midpoint position. Since each seismic trace in the virtual shot gather is the result of a stacking process, the signal-to-noise (S/N) ratio is increased by making coherent signals stronger and uncorrelated signal (noise) weaker.

In step 230, the computer system groups the pilot traces for the multiple XYO bins into multiple virtual shot gathers. Each virtual shot gather includes a collection of pilot traces having the same X and Y coordinates and different O coordinates. Thus, the process is repeated for all the available offsets to reconstruct a full virtual shot gather including a combination of all the pilot traces. The full virtual shot gather is an expression of a virtual shot gather at a given XY midpoint position. The artificially reconstructed pre-stack gather resembles the seismic shot gather at a surface position, consistent with the XY midpoint position, with increased accuracy and a greater S/N ratio.

Stacking, as previously described, generally includes adding and averaging multiple traces together to improve the signal-to-noise ratio of the combined trace. The signal-to-noise ratio, or S/N, increases by the square root of the number of traces in the stack. The stacking process improves S/N when the noise is randomly distributed and superimposed to coherent signal. Weighted stacking is an additional approach to weight the contribution of each trace to the process, for example by their cross-correlation coefficient. Given that the stacking process is averaging, it is subject to the effect of outliers that influence the outcome of the operation. The data processing system is configured to evaluate individual anomalous amplitude traces for removal (elimination) before proceeding to the stacking process. Step 236 includes the iterative rejection of anomalous traces. The data processing system performs step 236 before the evaluation and correction of the surface-consistent amplitude anomalies as performed in step 238.

Figure 5:
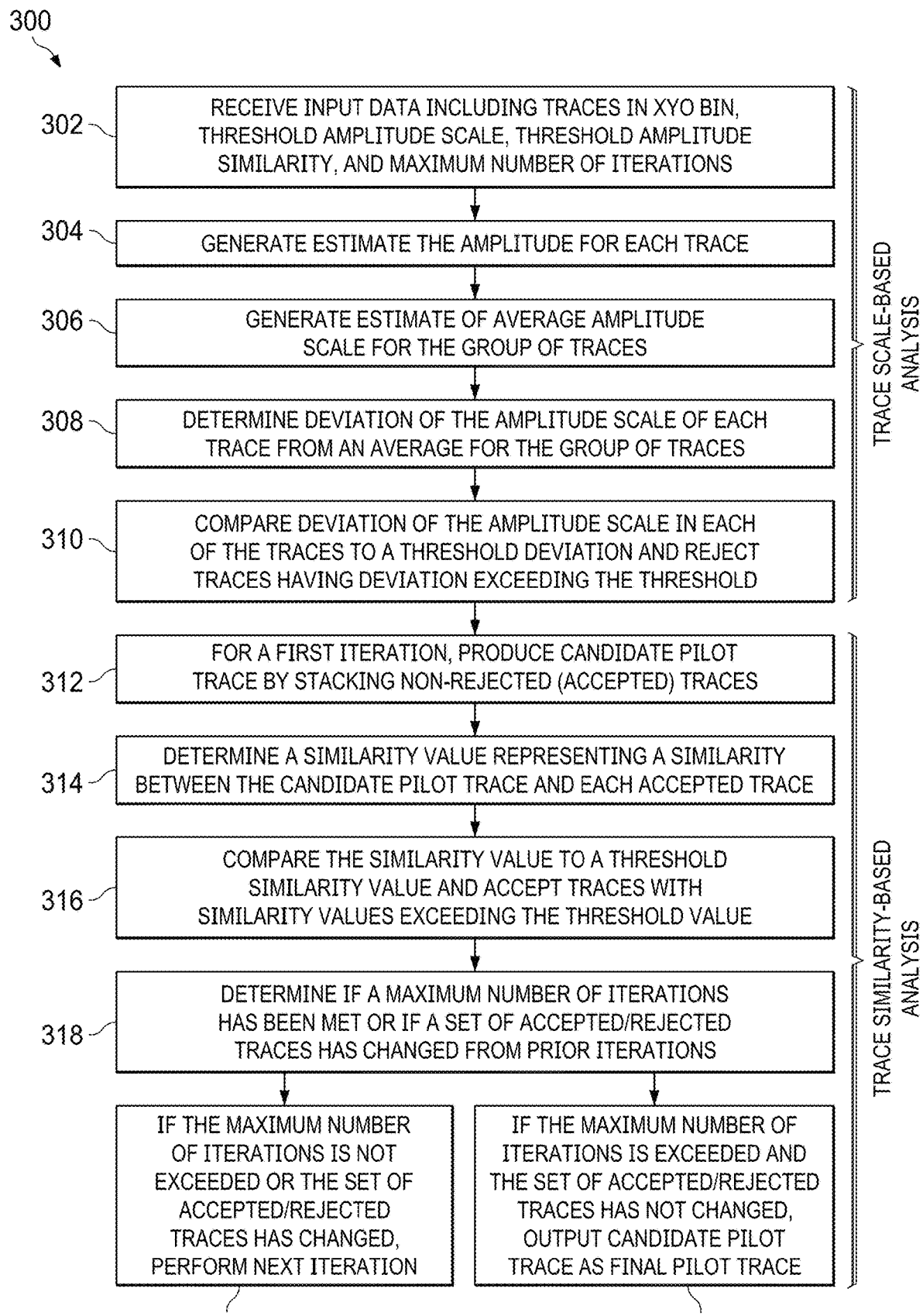
FIG. 5 shows a process for automatic iterative rejection of anomalous traces.

Turning briefly to FIG. 5, process 300 shows steps performed by the data processing system for completing step 236 of FIG. 4. The process 300 is performed for automatic iterative rejection of anomalous traces. Process 300 is conceptually divided into two parts including a trace scale-based analysis and a trace similarity-based analysis by the data processing system. The purpose of the trace scale-based analysis is to reject traces that exhibit an anomalous amplitude scale. Such traces can occur, for example, when a recording instrument (sensor) is malfunctioning or has a gain that is not correctly calibrated. This yields traces that have very low or very high amplitudes and which are not representative. The data processing system is configured to detect these traces during process 300 and mark them as rejected traces. The data processing system marks traces having a consistent scale as accepted. The accepted traces are inputs for the trace similarity-based analysis. The purpose of the trace similarity-based analysis is to reject traces that are too dissimilar (exceeding a threshold dissimilarity or otherwise failing a threshold similarity). Dissimilar or failing traces include events that have a significantly different character (statistically) than an average trace of the group. Once the data processing system rejects the dissimilar traces, the remaining traces are stacked to form a pilot trace that becomes part of a VSG. Thresholds applicable for similarity are model-specific.

For process 300, the data processing system receives, at step 302, seismic data including independent XYO bins and outputs an output trace per bin. The data processing system determines, at step 304, an estimate of an amplitude of each trace by determining an $l_2$-norm (energy) of each trace in the bin. The $l_2$-norm represents a measure of the amplitude scale of the trace. The data processing system determines, at step 306, an estimate of a median of the $l_2$-norms of all traces. The data processing system, at step 308, determines an estimate of a median absolute deviation (MAD) for each trace in the group of traces. The median and MAD are accurate replacements of the mean and standard deviation. The accuracy enables effective estimates of the average scale and the standard deviation by the data processing system. At step 310, the data processing system compares the deviation of the amplitude scale for each of the traces to a threshold deviation. The data processing system rejects traces that deviate more than $\theta_{MAD}$ MADs from the median. The MAD can be optionally scaled such that it becomes a consistent estimator of the standard deviation. A value of the scaling factor depends on the statistical distribution of the trace $l_2$-norms. Alternatively, the data processing system can represent this scaling in the parameter $\theta_{MAD}$.

The data processing system further processes the traces having a consistent amplitude scale in the trace similarity-based analysis. The data processing system, at step 312, in a first iteration, stacks the traces to produce a candidate pilot trace. The data processing system determines, at step 314, an $l_2$-norm of the pilot representing a similarity between each accepted trace and the candidate pilot trace.

The data processing system, at step 316, compares the similarity value of each trace to a threshold similarity value and accepts traces having the threshold similarity values exceeding the threshold. The data processing system performs this comparison by determining a dot product of each accepted trace in the bin with the candidate pilot and dividing the result by the $l_2$-norms of the trace and the pilot. Mathematically, this operation yields the cosine of the angle formed between the trace and the candidate pilot trace and represents a scale-invariant measure of similarity between the trace and the pilot trace. The values of the result can be from −1 (representing that the trace and the candidate pilot the combine to a negative scaling factor) to 1 (representing that the trace and the candidate pilot trace combine to a positive scaling factor). The data processing system accepts traces that are similar to the candidate pilot trace with a positive scaling factor (the same polarity). A threshold $\theta_{SIM} \in (0,1]$ is applied. The data processing system rejects traces with similarity less than this threshold.

The data processing system, at step 318, determines if a maximum number of iterations has been met or if a set of accepted/rejected traces has changed from prior iterations. At step 320, the data processing system determines that steps 312, 314, 316, and 318 are repeated when the maximum number of iterations is not exceeded or the set of accepted/rejected traces has changed. At step 322, the data processing system determines that a maximum number of iterations is reached, or the set of accepted traces remains unmodified for two consecutive iterations. The candidate pilot trace is then output as the final pilot trace. Typically 2-3 iterations are enough to obtain a final candidate output trace. After the application of these steps, the resulting pilot becomes part of a VSG.

Returning to FIG. 4, once process 300 is completed, the data processing system performs, at step 238, an iterative correction of surface-consistent amplitude anomalies. Processes 400 and 450 of FIGS. 6A and 6B, respectively, show two examples of process for iterative correction of surface-consistent amplitude anomalies of step 238. The two different processes 400, 450 can be independently or jointly applied to obtain traces amplitude balancing (process 400) and deconvolution (process 450). In both processes 400, 450, the data processing system corrects the seismic traces from amplitude distortions introduced by local medium anomalies restricted at the source and receiver locations or by other acquisition-related irregularities. These irregularities include bad coupling of sources and/or receivers with the ground. For process 400, amplitude distortions of the wavefields (or the corresponding acquired traces) are frequency independent. A scaling value (correction coefficient) for each source and receiver is sufficient to compensate for these distortion through an operation of amplitude balancing. For process 450, amplitude anomalies are varying with the frequency. In this case, source and receiver frequency operators are estimated by the data processing system, to compensate the amplitude anomalies, through an operation of amplitude deconvolution. Aspects of these processes 400, 450 are described in U.S. Pat. No. 10,852,450, filed on May 3, 2017, the contents of which are incorporated by reference in entirety. Iterative aspects are added to estimate the amplitude correction coefficients (for amplitude balancing) and frequency operators (for amplitude deconvolution).

Figure 6A:
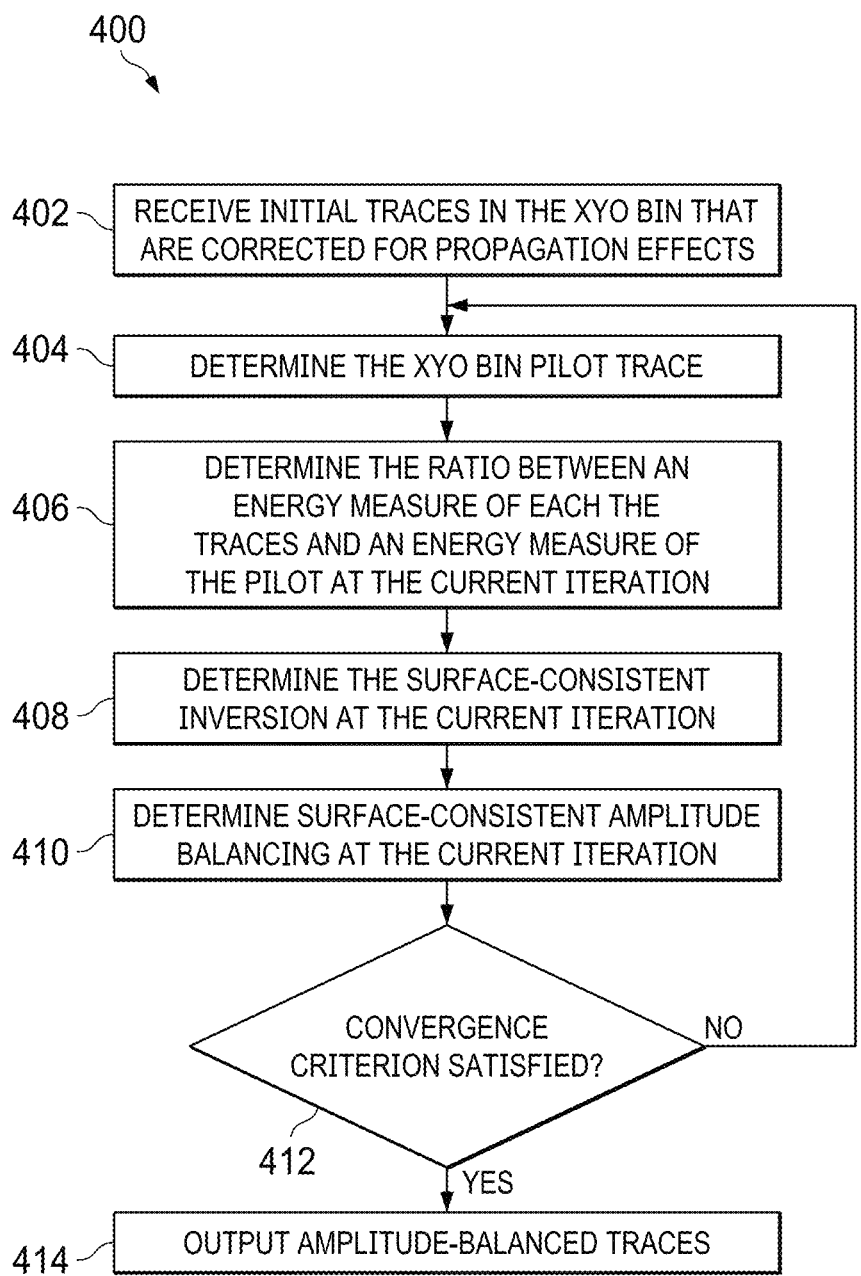
FIG. 6A shows a process for automatic iterative correction of amplitude anomalies using iterative amplitude balancing.

FIG. 6A shows a process 400 for automatic iterative correction of amplitude anomalies using iterative amplitude balancing. The data processing system operates on independent XYO bins. At step 402, the data processing system receives unbalanced seismic traces belonging to that XYO bin, previously corrected for the propagation effects through spherical divergence and long wavelength statics compensations. The data processing system applies residual statics to remove time delays between the traces of a bin related to source and receiver localized phase anomalies.

At step 404, the data processing system determines the XYO bin pilot trace, which represents an average behavior of the traces of the bin. The data processing system can perform step 404 in several ways. For example, the data processing system can take a stack of the traces.

At step 406, the data processing system determines a measure of the energy of each singular trace and a measure of the energy of the pilot trace. The data processing system determines, for each trace, the ratio between the trace energy measure and the energy measure of the pilot trace.

At step 408, the data processing system performs a surface-consistent inversion of the previously computed energy measure ratios. The data processing system derives the source and receiver amplitude scaling factors and an inversion residual.

At step 410, the data processing system, applies, for each trace, the associated source and receiver scaling factors to perform amplitude balancing. The data processing system divides the trace samples for the two amplitude coefficients.

At step 412, the data processing system determines whether a convergence criterion is satisfied. The convergence criterion can include, but is not limited to, the surface consistent inversion residual being lower than a user-specified threshold. If the convergence condition is not satisfied, the data processing system uses the balanced traces to iterate the sequence through steps 404, 406, 408, and 410. At step 414, when convergence condition is satisfied, the data processing system stops the iterative procedure, and outputs the final amplitude balanced traces are outputted.

Figure 6B:
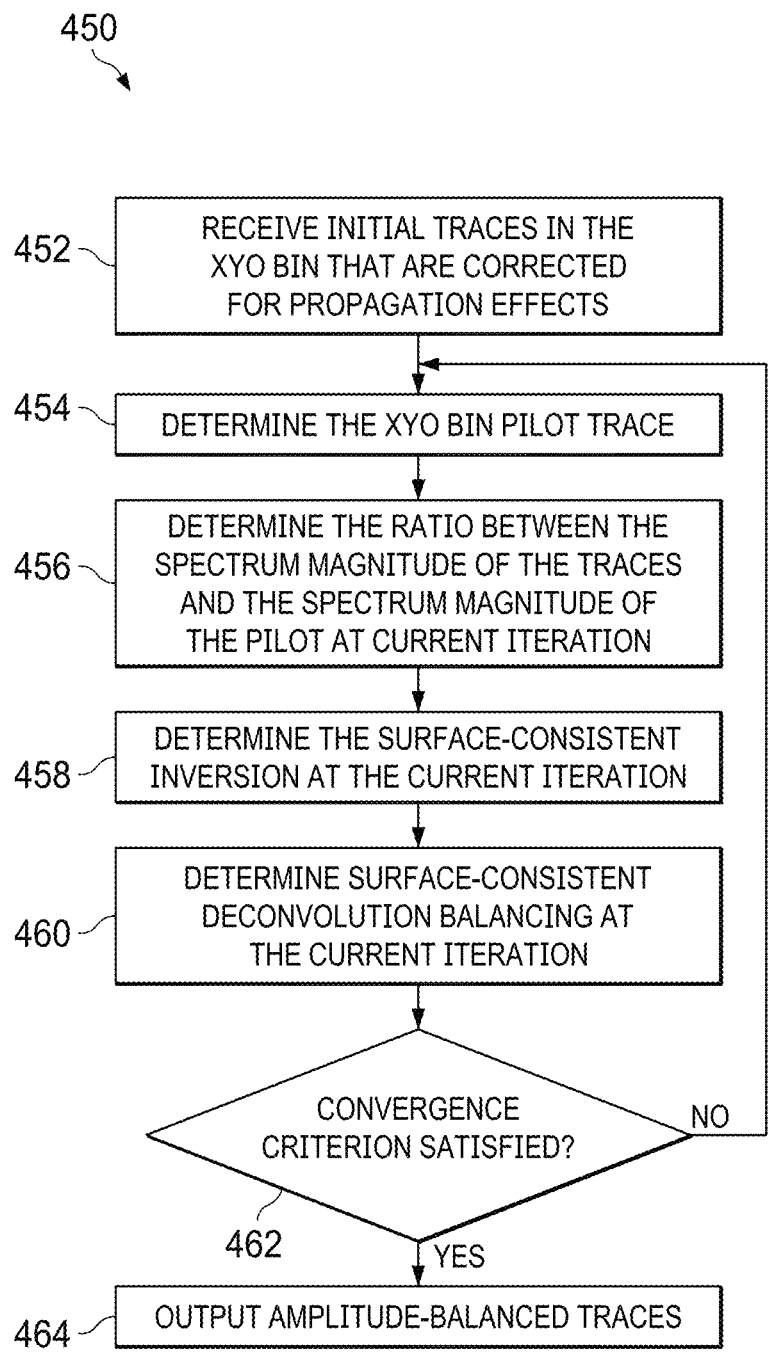
FIG. 6B shows a process for automatic iterative correction of amplitude anomalies using iterative amplitude deconvolution.

FIG. 6B shows a process 450 for automatic iterative correction of amplitude anomalies using iterative amplitude deconvolution. The iterative amplitude deconvolution algorithm is a generalization of the iterative amplitude balancing algorithm assuming frequency dependence of the source and receiver amplitude anomalies. The data processing system operates on independent XYO bins with the same input as for the iterative amplitude balancing algorithm previously described. At step 452, the data processing system receives the unbalanced seismic traces belonging to that XYO bin, previously corrected for the propagation effects through spherical divergence and long wavelength statics compensations and for the residual statics to remove time delays between the traces of a bin related to source and receiver localized phase anomalies. The algorithm operates in the frequency domain where the different frequency components can be computed independently (considering one frequency at the time) or jointly (considering all the frequency at the same time).

The data processing system determines, at step 454, a pilot trace spectrum representing average behavior of the traces of the bin in the frequency domain. The data processing system can determine the pilot trace spectrum in different ways. In a non-limiting example, the data processing system performs a stacking of the traces' spectra.

The data processing system determines, at step 456, for each trace, the ratio between a measure of its spectrum magnitude and the one of the pilot trace. The data processing system is configured to perform, at step 458, a surface-consistent inversion of the previously computed spectra ratios to derive the source and receiver amplitude frequency operators and an inversion residual operator.

The data processing system, at step 460, for each trace, applies the associated source and receiver frequency operators (amplitude deconvolution) by dividing the trace spectrum for the two amplitude frequency operators. The data processing system compares a convergence criterion to a threshold. For example, an energy of the surface consistent inversion residual operator is checked to determine whether it is lower than a user-specified threshold. At step 462, if the convergence condition is not satisfied, the data processing system uses the deconvolved traces to iterate the sequence through steps 454, 456, 458, and 460. When convergence condition is satisfied, data processing system stops iterative procedure at step 464. The data processing system outputs the final amplitude-deconvolved traces.

Returning to FIG. 4, the data processing system is configured to perform a stacking, at step 240, of the eVSGs. The data processing system performs step 240 by stacking of the traces contained in the XYO bin after these have been corrected by automatic iterative surface-consistent residual statics (at step 228), automatic iterative rejection of anomalous traces (at step 236), and automatic iterative correction of surface-consistent amplitude anomalies (at step 238), as previously described. The stacking process can include simple averaging (for each time sample the mean value of the amplitudes in the XYO gather), a weighted stack (each trace in the XYO is multiplied by a weight from the cross-correlation coefficient to the pilot trace and then the mean is calculated), a median stack (for each time sample the median amplitude is considered and selected), or one or more other similar processes. The eVSG are VSG having S/N improvement obtained through surface-consistent approaches that preserve frequency content, provide balanced amplitudes and remove bad traces. eVSGs are also virtual gathers reconstructed at the CMP (the source-receiver midpoint position). As such, the data processing system can use, at step 242, the eVSG for seismic data processing operations such as first break picking, velocity analysis (normal moveout—NMO velocity picking), CMP stacking, and time/depth imaging (migration).

At step 244, the data processing system is configured to perform post-stack processing on the eVSG data to prepare the data for 1.5 D FWI. These additional processes are typically performed by the data processing system to prepare the generated eVSG for the 1.5 D FWI. Depending on what type of FWI domain is used, different processing steps are performed. The VSG are volumetric averages and therefore describe an average 1D behavior. As such, the VSG are well described by 1.5D FWI, which is a 1D model, but is called 1.5 D because an offset is included.

Generally, the post-stack processing is performed not because of the way the VSG are generate but to remove signal that is not modeled by the forward modeling engine. In this example, acoustic forward modeling (P-waves) are used. What is muted is related to elastic (S-waves). These are muted because they are not being modeled.

The data processing system performs the outer mute at step 244. A digital removal of arrivals before the first breaks (a sharp division in offset-time space between elements that are retained unchanged in magnitude and those deleted entirely) generally may not be necessary for FWI processes working in the time domain. When using FWI in the Fourier (i.e. frequency) and in the Laplace-Fourier domains, the data processing system removes noise and unwanted signals before the onset of the seismic waves. The data processing system thus mutes all the signals before the first arrivals (first break travel times). This operation can be performed automatically in different ways. The data processing system can generate, at step 234, cleaned first break travel times statistical trend data. The data processing system can use this statistical trend data to generate a robust estimate of the seismic wave onset time to be used for muting purposes. The data processing system can use a supervised machine learning approach, in which an automated supervised learning the first break travel time statistical trends are used to provide training of a convolutional neural network (CNN). The CNN predicts (and possibly refines) the first break travel time prediction.

Figure 7:
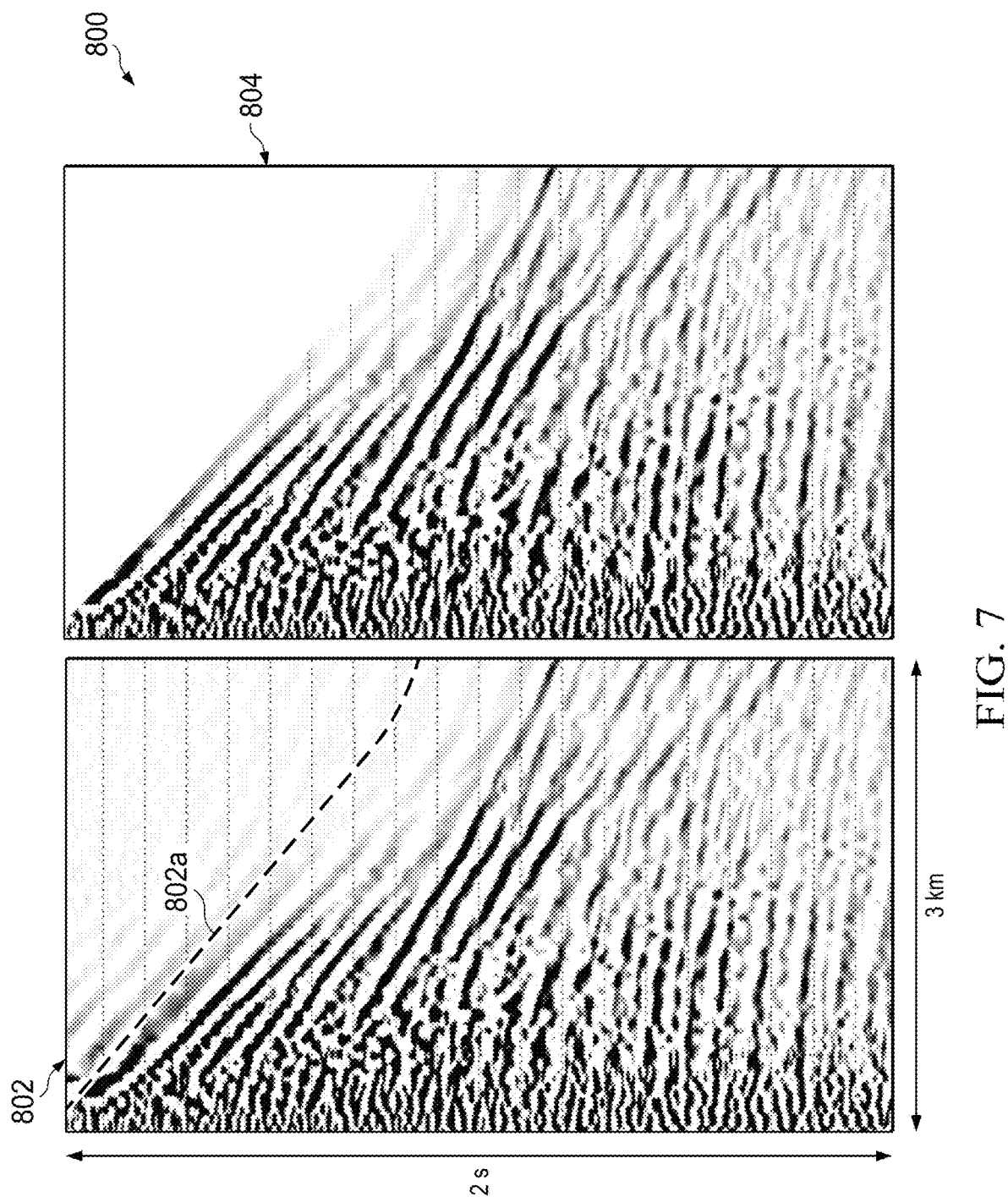
FIG. 7 illustrates example data showing an outer mute on an eVSG using the first break travel times and a muted eVSG.

FIG. 7 shows example seismic data 800 including an example of an outer mute on an eVSG using the first break travel times statistical trend (dotted line 802a) in panel 802. An example of a muted eVSG is shown in panel 804.

Returning to FIG. 4, the data processing system performs, at step 246, an automatic inner mute of the noise including surface waves. The data processing system, removes or significantly attenuates the dispersive surface waves (SW) when performing FWI on land seismic data. This is because these wave types are not modeled by the acoustic wave equation. Even for an elastic forward modeling process, the spatial sampling of such surface waves, typical of conventional seismic acquisition layouts, is generally insufficient. The resulting signal is generally heavily affected by aliasing in the wavenumber domain. An alternative is to use frequency-wavenumber filters to attenuate the surface wave signal, though this may alter the frequency content of the data and cause the data to be less similar to the signals generated by the forward modeling operation (base of the FWI process).

Figure 8:
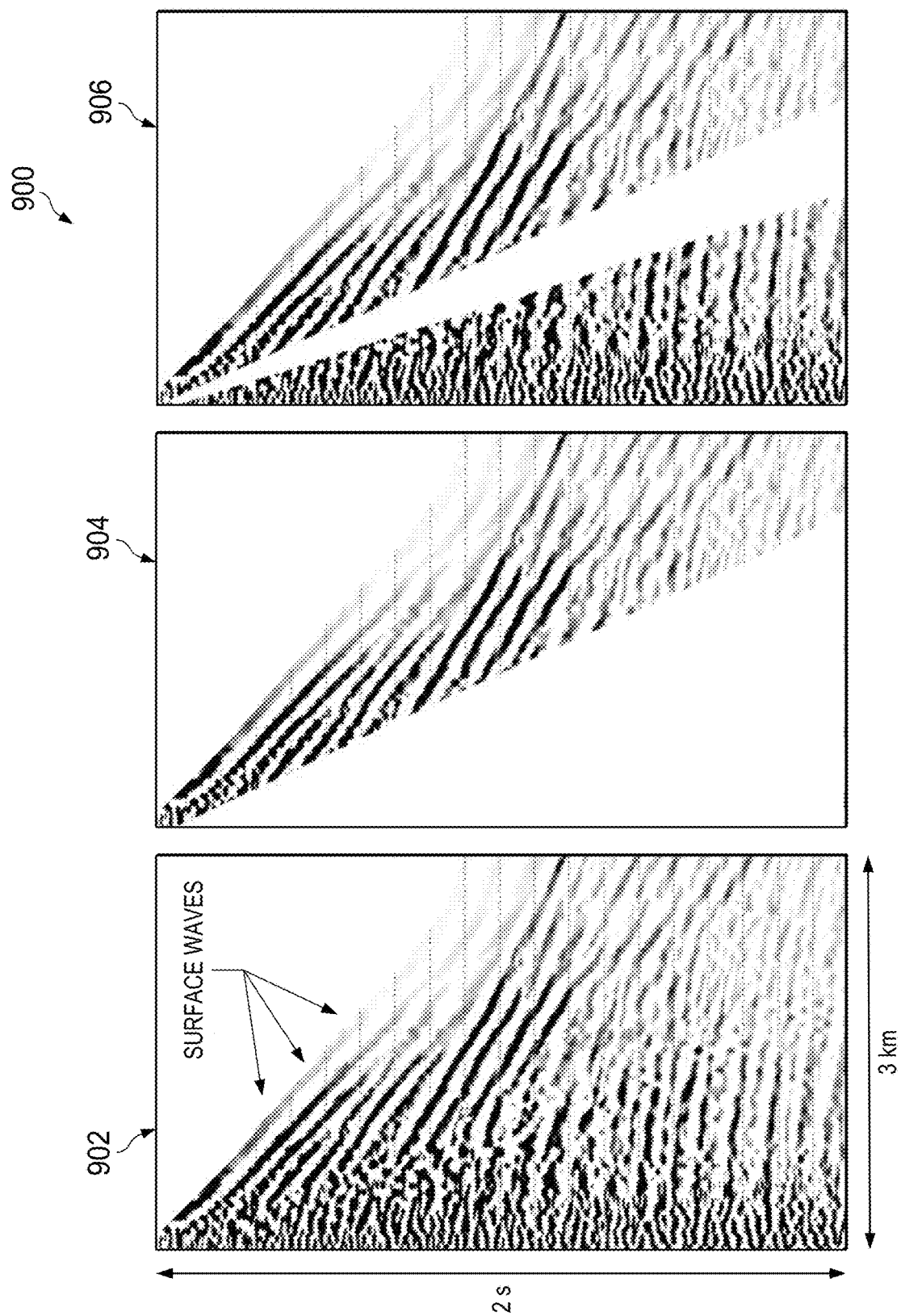
FIG. 8 illustrates example data showing an eVSG with an outer mute applied and indication of surface wave expressions, example data showing an inner mute, and the example data showing a surgical mute.

To avoid such frequency distortions as possibly introduced by frequency-wavenumber filters, the data processing system performs, at step 246, muting of the surface wave expressions on the gathers. The mute is typically an inner mute meaning that the cone defined by the first appearance of the surface waves towards the shorter offsets is muted, as shown in example data of panel 904 of FIG. 8. In another example, the mute is surgical such that only surface waves or other linear trends are digitally removed from the data or muted, as show in example data panel 906. Panel 902 shows the outer mute of panel 804 of FIG. 7 for direct comparison.

The data processing system generates, at step 232, a CMP velocity model. The generated CMP velocity model is used by the data processing system at step 246 to perform an automatic outer mute of noise occurring before the first arrival data. The model is a pseudo-3D velocity model previously described. To perform muting automatically, the following processes can be used. A first process includes a deterministic estimation of $V_s$ velocity model based on the available output of step 232 and an estimate of the $V_p/V_s$ ratio through joint inversion. This process is further described in Colombo d., D. Rovetta, T. Al-Yousuf, E. Sandoval, E. Turkoglu, and G. McNeice, 2020. Multiple joint wavefield inversion: Theory and field data implementations: The Leading Edge, June 2020, Special Section Middle East, 411-421, the contents of which are incorporated herein in entirety. In another example, SW trends are manually selected for a number of gathers. The muting slopes are interpolated for all the remaining eVSG such as using a co-kriging method using the $V_p$ from step 232 as the guiding or supporting property distribution for the co-kriging method. In another example, once an S-velocity (shear velocity $V_s$) model is obtained, the SW can be predicted through forward modeling and subtracted from the dataset. As previously described, the data processing system can use an unsupervised machine learning approach or a use of a supervised machine learning approach.

The data processing system has now generated, based on steps 244 and 246, edited eVSG data at step 248. The edited eVSG data are optimally processed for the data processing system, at step 248 perform 1.5 D FWI, as previously described. The result enables accurate corrections for the near surface can occur because high-resolution velocity models are represented for land seismic data. The process 220 performed by the data processing system provides a unique approach for enhancing the S/N content of the data by a series of surface-consistent steps. The result is that the enhanced virtual super gathers (eVSG) are optimally suited for 1.5 D FWI.

Figure 9:
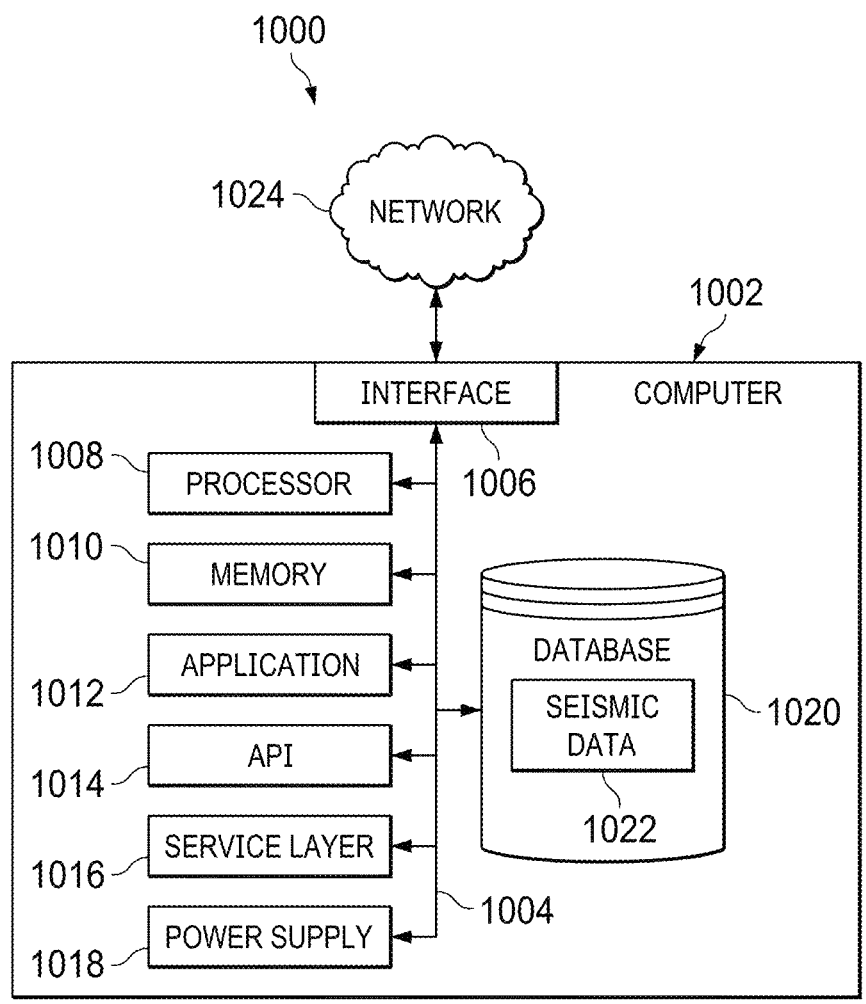
FIG. 9 is a diagram of an example computing system.

FIG. 9 is a block diagram of an example computing system 1000 used to provide computational functionalities associated with described algorithms, methods, functions, processes, flows, and procedures described in the present disclosure, according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI).

The computer 1002 can serve in a role as a client, a network component, a server, a database, a persistency, or components of a computer system for performing the subject matter described in the present disclosure. The illustrated computer 1002 is communicably coupled with a network 1024. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1024 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1004. In some implementations, any or all of the components of the computer 1002, including hardware or software components, can interface with each other or the interface 1006 (or a combination of both), over the system bus 1004. Interfaces can use an application programming interface (API) 1014, a service layer 1016, or a combination of the API 1014 and service layer 1016. The API 1014 can include specifications for routines, data structures, and object classes. The API 1014 can be either computer-language independent or dependent. The API 1014 can refer to a complete interface, a single function, or a set of APIs.

The service layer 1016 can provide software services to the computer 1002 and other components (whether illustrated or not) that are communicably coupled to the computer 1002. The functionality of the computer 1002 can be accessible for all service consumers using this service layer. Software services, such as those provided by the service layer 1016, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1014 or the service layer 1016 can be stand-alone components in relation to other components of the computer 1002 and other components communicably coupled to the computer 1002. Moreover, any or all parts of the API 1014 or the service layer 1016 can be implemented as child or sub-modules of another software module, enterprise application, or hardware module without departing from the scope of the present disclosure.

The computer 1002 includes an interface 1006. Although illustrated as a single interface 1006 in FIG. 9, two or more interfaces 1006 can be used according to particular needs, desires, or particular implementations of the computer 1002 and the described functionality. The interface 1006 can be used by the computer 1002 for communicating with other systems that are connected to the network 1024 (whether illustrated or not) in a distributed environment. Generally, the interface 1006 can include, or be implemented using, logic encoded in software or hardware (or a combination of software and hardware) operable to communicate with the network 1024. More specifically, the interface 1006 can include software supporting one or more communication protocols associated with communications. As such, the network 1024 or the hardware of the interface can be operable to communicate physical signals within and outside of the illustrated computer 1002.

The computer 1002 includes a processor 1008. Although illustrated as a single processor 1008 in FIG. 9, two or more processors 1008 can be used according to particular needs, desires, or particular implementations of the computer 1002 and the described functionality. Generally, the processor 1008 can execute instructions and can manipulate data to perform the operations of the computer 1002, including operations using algorithms, methods, functions, processes, flows, and procedures as described in the present disclosure.

The computer 1002 also includes a database 1020 that can hold data (for example, seismic data 1022) for the computer 1002 and other components connected to the network 1024 (whether illustrated or not). For example, database 1020 can be an in-memory, conventional, or a database storing data consistent with the present disclosure. In some implementations, database 1020 can be a combination of two or more different database types (for example, hybrid in-memory and conventional databases) according to particular needs, desires, or particular implementations of the computer 1002 and the described functionality. Although illustrated as a single database 1020 in FIG. 9, two or more databases (of the same, different, or combination of types) can be used according to particular needs, desires, or particular implementations of the computer 1002 and the described functionality. While database 1020 is illustrated as an internal component of the computer 1002, in alternative implementations, database 1020 can be external to the computer 1002.

The computer 1002 also includes a memory 1010 that can hold data for the computer 1002 or a combination of components connected to the network 1024 (whether illustrated or not). Memory 1010 can store any data consistent with the present disclosure. In some implementations, memory 1010 can be a combination of two or more different types of memory (for example, a combination of semiconductor and magnetic storage) according to particular needs, desires, or particular implementations of the computer 1002 and the described functionality. Although illustrated as a single memory 1010 in FIG. 9, two or more memories 1010 (of the same, different, or combination of types) can be used according to particular needs, desires, or particular implementations of the computer 1002 and the described functionality. While memory 1010 is illustrated as an internal component of the computer 1002, in alternative implementations, memory 1010 can be external to the computer 1002.

The application 1012 can be an algorithmic software engine providing functionality according to particular needs, desires, or particular implementations of the computer 1002 and the described functionality. For example, application 1012 can serve as one or more components, modules, or applications. Further, although illustrated as a single application 1012, the application 1012 can be implemented as multiple applications 1012 on the computer 1002. In addition, although illustrated as internal to the computer 1002, in alternative implementations, the application 1012 can be external to the computer 1002.

The computer 1002 can also include a power supply 1018. The power supply 1018 can include a rechargeable or non-rechargeable battery that can be configured to be either user- or non-user-replaceable. In some implementations, the power supply 1018 can include power-conversion and management circuits, including recharging, standby, and power management functionalities. In some implementations, the power-supply 1018 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1024. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 1002.11 a/b/g/n or 1002.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for generating a velocity model to improve an accuracy of seismic imaging of a subterranean formation, the method comprising:
   receiving, by a computer system, for each of a plurality of common midpoint-offset bins, each common midpoint-offset bin associated with data representing a plurality of seismic traces, a candidate pilot trace representing the common midpoint-offset bin;
   for each common midpoint-offset bin:
      generating, by the computer system, a corrected pilot trace based on an iterative rejection of anomalous traces of the plurality of seismic traces;
      performing, by the computer system, an iterative correction of surface-consistent amplitude anomalies for each trace in the plurality of seismic traces; and
      generating corrected traces based on the corrected pilot trace and based on the iterative correction of surface-consistent amplitude anomalies;
   grouping, by the computer system, the corrected traces for the plurality of common midpoint-offset bins into a plurality of enhanced virtual shot gathers (eVSGs); and
   generating, based on a waveform inversion of the plurality of enhanced virtual shot gathers, a seismic image representing the subterranean formation, the seismic image having less noise than a given seismic image generated independent of the plurality of enhanced virtual shot gathers, the seismic image for identifying a location where an interaction between layers of the subterranean formation are likely to trap oil or gas.

2. The method of claim 1, further comprising:
   performing, by the computer system, a 1.5 dimensional full waveform inversion based on the plurality of enhanced virtual shot gathers; and
   determining, by the computer system, a subsurface velocity model based on the 1.5 dimensional full waveform inversion.

3. The method of claim 1, further comprising:
   performing, on the grouping of the corrected traces for each enhanced virtual shot gather, an automatic outer mute of noise occurring before first arrival data.

4. The method of claim 3, further comprising:
   performing, on the grouping of the corrected traces for each enhanced virtual shot gather, an automatic inner mute of noise including surface waves of the eVSG.

5. The method of claim 1, further comprising generating the candidate pilot trace by performing operations including:
   sorting, by the computer system, the plurality of seismic traces into the plurality of common midpoint-offset bins;
   for each common midpoint-offset bin of the plurality of common midpoint-offset bins:
      applying, by the computer system, a linear moveout correction to a collection of seismic traces within the common midpoint-offset bin;
      stacking, by the computer system, the collection of seismic traces to form a pilot trace;
      determining, by the computer system, a surface-consistent residual static correction for each seismic trace of the collection of seismic traces;
      determining, by the computer system, that the surface-consistent residual static correction for each seismic trace is less than a threshold; and
      responsive to the determining that the surface-consistent residual static correction is less than the threshold, stacking, by the computer system, the collection of seismic traces to provide the candidate pilot trace for the common midpoint-offset bin.

6. The method of claim 1, wherein the iterative rejection of anomalous traces of the plurality of seismic traces comprises:
   receiving, for the common midpoint-offset bin, data representing the plurality of seismic traces, a threshold amplitude scale value and a threshold amplitude similarity value;
   for each trace of the plurality of seismic traces:
      estimating an amplitude of the trace; and
      determining a deviation value of the amplitude from an average amplitude scale for the plurality of traces;
   removing traces, from the plurality of seismic traces, associated with deviation values exceeding the threshold amplitude scale value;
   generating the candidate pilot trace by stacking remaining traces of the plurality of seismic traces;
   determining a similarity value representing a similarity between the candidate pilot trace and each of the remaining traces;
   comparing, for each remaining trace, the similarity value to the threshold amplitude similarity value;
   generating final traces by removing remaining traces for which the similarity value does not satisfy the threshold amplitude similarity value; and
   outputting, based on the final traces, the corrected pilot trace representing the common midpoint-offset bin.

7. The method of claim 1, wherein performing, by the computer system, the iterative correction of surface-consistent amplitude anomalies for each trace in the plurality of seismic traces comprises:
receiving the candidate pilot trace and the plurality of seismic traces for the common midpoint-offset bin;
for each trace of the plurality of seismic traces:
determining a ratio of a first energy measure of the trace and a second energy measure of the candidate pilot trace;
generating source and receiver scaling factors based on a surface-consistent inversion of the ratio for each trace; and
applying the source and receiver scaling factors to the trace to generate a balanced trace.

8. The method of claim 1, wherein performing, by the computer system, the iterative correction of surface-consistent amplitude anomalies for each trace in the plurality of seismic traces comprises:
receiving the candidate pilot trace and the plurality of seismic traces for the common midpoint-offset bin;
for each trace of the plurality of seismic traces:
determining a ratio of a first spectrum magnitude of the trace and a second spectrum magnitude of the candidate pilot trace;
generating source and receiver amplitude frequency operators based on a surface-consistent inversion of the ratio for each trace; and
applying the source and receiver amplitude frequency operators to the trace to generate an amplitude deconvolved trace.

9. A system for generating a velocity model to improve an accuracy of seismic imaging of a subterranean formation, the system comprising:
at least one processor; and
a memory storing instructions that, when executed by the at least one processor, cause the at least one processor to perform operations comprising:
receiving for each of a plurality of common midpoint-offset bins, each common midpoint-offset bin associated with data representing a plurality of seismic traces, a candidate pilot trace representing the common midpoint-offset bin;
for each common midpoint-offset bin:
generating a corrected pilot trace based on an iterative rejection of anomalous traces of the plurality of seismic traces;
performing an iterative correction of surface-consistent amplitude anomalies for each trace in the plurality of seismic traces; and
generating corrected traces based on the corrected pilot trace and based on the iterative correction of surface-consistent amplitude anomalies;
grouping the corrected traces for the plurality of common midpoint-offset bins into a plurality of enhanced virtual shot gathers (eVSGs); and
generating, based on a waveform inversion of the plurality of enhanced virtual shot gathers, a seismic image representing the subterranean formation, the seismic image having less noise than a given seismic image generated independent of the plurality of enhanced virtual shot gathers, the seismic image for identifying a location where an interaction between layers of the subterranean formation are likely to trap oil or gas.

10. The system of claim 9, the operations further comprising:
performing a 1.5 dimensional full waveform inversion based on the plurality of enhanced virtual shot gathers; and
determining a subsurface velocity model based on the 1.5 dimensional full waveform inversion.

11. The system of claim 9, the operations further comprising:
performing, on the grouping of the corrected traces for each enhanced virtual shot gather, an automatic outer mute of noise occurring before first arrival data.

12. The system of claim 11, the operations further comprising:
performing, on the grouping of the corrected traces for each enhanced virtual shot gather, an automatic inner mute of noise including surface waves of the eVSG.

13. The system of claim 9, the operations further comprising generating the candidate pilot trace by performing operations comprising:
sorting the plurality of seismic traces into the plurality of common midpoint-offset bins;
for each common midpoint-offset bin of the plurality of common midpoint-offset bins:
applying a linear moveout correction to a collection of seismic traces within the common midpoint-offset bin;
stacking the collection of seismic traces to form a pilot trace;
determining a surface-consistent residual static correction for each seismic trace of the collection of seismic traces;
determining that the surface-consistent residual static correction for each seismic trace is less than a threshold; and
responsive to the determining that the surface-consistent residual static correction is less than the threshold, stacking the collection of seismic traces to provide the candidate pilot trace for the common midpoint-offset bin.

14. The system of claim 9, wherein the iterative rejection of anomalous traces of the plurality of seismic traces comprises:
receiving, for the common midpoint-offset bin, data representing the plurality of seismic traces, a threshold amplitude scale value and a threshold amplitude similarity value;
for each trace of the plurality of seismic traces:
estimating an amplitude of the trace; and
determining a deviation value of the amplitude from an average amplitude scale for the plurality of traces;
removing traces, from the plurality of seismic traces, associated with deviation values exceeding the threshold amplitude scale value;
generating the candidate pilot trace by stacking remaining traces of the plurality of seismic traces;
determining a similarity value representing a similarity between the candidate pilot trace and each of the remaining traces;
comparing, for each remaining trace, the similarity value to the threshold amplitude similarity value;
generating final traces by removing remaining traces for which the similarity value does not satisfy the threshold amplitude similarity value; and
outputting, based on the final traces, the corrected pilot trace representing the common midpoint-offset bin.

15. The system of claim 9, wherein performing the iterative correction of surface-consistent amplitude anomalies for each trace in the plurality of seismic traces comprises:
- receiving the candidate pilot trace and the plurality of seismic traces for the common midpoint-offset bin;
- for each trace of the plurality of seismic traces:
  - determining a ratio of a first energy measure of the trace and a second energy measure of the candidate pilot trace;
  - generating source and receiver scaling factors based on a surface-consistent inversion of the ratio for each trace; and
  - applying the source and receiver scaling factors to the trace to generate a balanced trace.

16. The system of claim 9, wherein performing the iterative correction of surface-consistent amplitude anomalies for each trace in the plurality of seismic traces comprises:
- receiving the candidate pilot trace and the plurality of seismic traces for the common midpoint-offset bin;
- for each trace of the plurality of seismic traces:
  - determining a ratio of a first spectrum magnitude of the trace and a second spectrum magnitude of the candidate pilot trace;
  - generating source and receiver amplitude frequency operators based on a surface-consistent inversion of the ratio for each trace; and
  - applying the source and receiver amplitude frequency operators to the trace to generate an amplitude deconvolved trace.

17. One or more non-transitory computer readable media storing instructions for generating a velocity model to improve an accuracy of seismic imaging of a subterranean formation, the instructions, when executed by at least one processor, configured to cause the at least one processor to perform operations comprising:
- receiving for each of a plurality of common midpoint-offset bins, each common midpoint-offset bin associated with data representing a plurality of seismic traces, a candidate pilot trace representing the common midpoint-offset bin;
- for each common midpoint-offset bin:
  - generating a corrected pilot trace based on an iterative rejection of anomalous traces of the plurality of seismic traces;
  - performing an iterative correction of surface-consistent amplitude anomalies for each trace in the plurality of seismic traces; and
  - generating corrected traces based on the corrected pilot trace and based on the iterative correction of surface-consistent amplitude anomalies;
- grouping the corrected traces for the plurality of common midpoint-offset bins into a plurality of enhanced virtual shot gathers (eVSGs); and
- generating, based on a waveform inversion of the plurality of enhanced virtual shot gathers, a seismic image representing the subterranean formation, the seismic image having less noise than a given seismic image generated independent of the plurality of enhanced virtual shot gathers, the seismic image for identifying a location where an interaction between layers of the subterranean formation are likely to trap oil or gas.

18. The one or more non-transitory computer readable media of claim 17, the operations further comprising:
- performing a 1.5 dimensional full waveform inversion based on the plurality of enhanced virtual shot gathers; and
- determining a subsurface velocity model based on the 1.5 dimensional full waveform inversion.

19. The one or more non-transitory computer readable media of claim 17, the operations further comprising:
- performing, on the grouping of the corrected traces for each enhanced virtual shot gather, an automatic outer mute of noise occurring before first arrival data.

20. The one or more non-transitory computer readable media of claim 19, the operations further comprising:
- performing, on the grouping of the corrected traces for each enhanced virtual shot gather, an automatic inner mute of noise including surface waves of the eVSG.

* * * * *